US008957133B2

(12) United States Patent
Desbois et al.

(10) Patent No.: US 8,957,133 B2
(45) Date of Patent: Feb. 17, 2015

(54) POLYAMIDE MOLDINGS COMPRISING MICROENCAPSULATED LATENT-HEAT-ACCUMULATOR MATERIAL

(75) Inventors: Philippe Desbois, Edingen-Neckarhausen (DE); Tina Schröder-Grimonpont, Rheinzabern (DE); Stephan Altmann, Ruppertsberg (DE); Marco Schmidt, Speyer (DE)

(73) Assignee: BASF SE, Ludwigshafen (DE)

( * ) Notice: Subject to any disclaimer, the term of this patent is extended or adjusted under 35 U.S.C. 154(b) by 166 days.

(21) Appl. No.: 13/184,863

(22) Filed: Jul. 18, 2011

(65) Prior Publication Data
US 2012/0022187 A1 Jan. 26, 2012

Related U.S. Application Data

(60) Provisional application No. 61/365,805, filed on Jul. 20, 2010.

(51) Int. Cl.
C08K 9/10 (2006.01)
C08L 77/02 (2006.01)
C08L 1/00 (2006.01)
C08G 69/18 (2006.01)
C08G 69/24 (2006.01)

(52) U.S. Cl.
CPC . *C08L 1/00* (2013.01); *C08G 69/18* (2013.01); *C08G 69/24* (2013.01); *C08L 77/02* (2013.01)
USPC .......................................... 523/205; 524/606

(58) Field of Classification Search
USPC ............................... 523/205; 24/606; 524/606
See application file for complete search history.

(56) References Cited

U.S. PATENT DOCUMENTS

| 3,216,977 | A | * | 11/1965 | Brouns | 528/314 |
| 4,362,862 | A | * | 12/1982 | Bour et al. | 528/314 |
| 4,756,958 | A | * | 7/1988 | Bryant et al. | 428/320.2 |
| 5,091,130 | A | * | 2/1992 | Bahia | 264/103 |
| 5,456,852 | A |   | 10/1995 | Isiguro | |
| 6,689,466 | B2 | * | 2/2004 | Hartmann | 428/402.2 |
| 7,892,644 | B2 | * | 2/2011 | Amrhein et al. | 428/402.21 |
| 2007/0249753 | A1 | * | 10/2007 | Lin et al. | 523/200 |

FOREIGN PATENT DOCUMENTS

| DE | 1 420 241 | 2/1969 |
| DE | 2 214 410 | 10/1973 |
| DE | 24 45 813 | 4/1976 |
| DE | 196 29 525 A1 | 1/1998 |
| DE | 196 29 526 A1 | 1/1998 |
| DE | 101 39 171 A1 | 2/2003 |
| DE | 101 63 162 A1 | 7/2003 |
| DE | 10 2008 005 721 A1 | 8/2009 |
| EP | 0 333 145 A1 | 9/1989 |
| EP | 0 407 889 A1 | 1/1991 |
| EP | 1 029 018 B1 | 9/2001 |
| EP | 0 784 449 B1 | 1/2003 |
| EP | 1 321 182 A1 | 6/2003 |
| WO | WO 2005/116559 A1 | 12/2005 |
| WO | WO 2008/046839 A1 | 4/2008 |
| WO | WO 2008/071649 A2 | 6/2008 |

* cited by examiner

*Primary Examiner* — Vickey Nerangis
(74) *Attorney, Agent, or Firm* — Oblon, Spivak, McClelland, Maier & Neustadt, L.L.P.

(57) ABSTRACT

The present invention relates to polyamide moldings obtainable via anionic polymerization of a lactam comprising microcapsules with a capsule core made of latent-heat-accumulator material and a polymer as capsule wall, to a process for producing the same, and also to the use of the same in motor-vehicle construction, as battery housing, as housing for small electronic devices, and for heat-retention systems for foods.

28 Claims, No Drawings

POLYAMIDE MOLDINGS COMPRISING MICROENCAPSULATED LATENT-HEAT-ACCUMULATOR MATERIAL

The present invention relates to polyamide moldings obtainable via anionic polymerization of a lactam comprising microcapsules with a capsule core made of latent-heat-accumulator material and a polymer as capsule wall. The present invention also relates to a process for producing the same, and also to the use of the same in motor-vehicle construction, as battery housing, as housing for small electronic devices, and for heat-retention systems for foods.

Polyamide moldings can be produced by what is known as the alkaline rapid polymerization process, which is a polymerization process that proceeds by an anionic route from lactams to give polyamide known as "cast polyamide". Unlike the conventional production of moldings, this does not mold a molten polymer or post-crosslink a prepolymer in a mold, but instead polymerizes the monomer or a monomer mixture directly in the mold. The product of the anionic polymerization reaction is a linear polyamide and therefore a thermoplastic. An advantage of the cast polymerization process is processing in a single step from the monomer to give the finished composite component, therefore permitting use of higher filler loadings. The anionic polymerization of lactam is carried out in the presence of a catalyst which accelerates the reaction or lowers the reaction temperature.

By way of example, DE-A-14 20 241 describes anionic polymerization of lactams in the presence of potassium hydroxide as catalyst and 1,6-bis(N,N-dibutylureido)hexane as activator.

Polyamide moldings are increasingly used to replace metallic materials. However, they are unlike metals in having low heat capacity. It was therefore an object of the present invention to improve the heat-accumulator properties of polyamide moldings.

In recent years there have been many different developments in the field of microencapsulated latent-heat accumulators. The latent-heat accumulators are also often termed PCM (phase-change material), and they function by using the enthalpy of fusion that arises during the solid/liquid phase transition and that causes absorbing of energy or dissipation of energy into the environment. They can therefore be used to keep temperature constant within a defined temperature range.

By way of example, EP-A-1 029 018 and EP-A 1 321 182 teach the use of microcapsules with a capsule wall made of highly crosslinked methacrylate polymer and a latent-heat-accumulator core in binder construction materials, such as concrete or gypsum plaster. DE-A-101 39 171 describes the use of microencapsulated latent-heat-accumulator materials in gypsum plasterboard. The microcapsule walls are constructed via polymerization of methyl methacrylate and butanediol diacrylate in the presence of solid inorganic particles, as protective colloid. WO 2005/116559 moreover teaches the use of microencapsulated latent-heat-accumulator materials in particle board, together with melamine-formaldehyde resins, as binders.

Accordingly, polyamide moldings which are obtainable via anionic polymerization of a lactam have been found, comprising microcapsules with a capsule core made of latent-heat-accumulator material and a polymer as capsule wall, and a process for producing the same, and also the use of the same in motor-vehicle construction, as battery housing, as housing for small electronic devices, and for heat-retention systems for foods.

An advantageously suitable lactam is caprolactam, piperidone, pyrrolidone, laurolactam, or a mixture of these, preferably caprolactam, laurolactam, or a mixture of these, particularly preferably caprolactam or laurolactam. It is possible not only to use copolymers made of various lactams but also to use, as monomers, a lactone, such as caprolactone, in the form of comonomer. The amount of lactone in the form of comonomer here should not exceed 40% by weight, based on the entirety of monomer. It is preferable that the proportion of lactone in the form of comonomer does not exceed 10% by weight, based on the entirety of monomer. It is preferable that no lactone is used in the form of comonomer.

The anionic polymerization reaction is carried out in the presence of an activator. For the purposes of this application, an activator for the anionic polymerization process is a lactam N-substituted by electrophilic moieties, or is a precursor thereof, which forms in situ, together with a lactam, a lactam substituted by electrophilic moieties. The amount of activator defines the number of growing chains, since the activator is the initial reactive unit.

A suitable activator is provided by isocyanates, acyl halides, or reaction products of these with lactams.

Other compounds which are suitable as activator are aliphatic diisocyanates, such as butylene diisocyanate, hexamethylene diisocyanate, octamethylene diisocyanate, decamethylene diisocyanate, undecamethylene diisocyanate, dodecamethylene diisocyanate, and also aromatic diisocyanates, such as tolylene diisocyanate, isophorone diisocyanate, 4,4'-methylenebis(phenyl isocyanate), 4,4'-methylenebis(cyclohexyl isocyanate), or polyisocyanates, such as isocyanates of hexamethylene diisocyanate, Basonat® HI 100 (BASF SE), allophanates, such as ethyl allophanate, or a mixture of these, preferably hexamethylene diisocyanate, isophorone diisocyanate, and particularly preferably hexamethylene diisocyanate.

The anionic polymerization reaction is preferably carried out in the presence of a catalyst. For purposes of this application, a catalyst for the anionic polymerization reaction is a compound which permits the formation of lactam anions, or is the lactam anions themselves.

Catalysts of this type are disclosed by way of example in Polyamide, Kunststoff Handbuch [Polyamides, Plastics handbook] Vol. 3/4, ISBN 3-446-16486-3, 1998, Carl Hanser Verlag, 49-52. That publication describes the use of Na caprolactamate as catalyst combined with acyl lactam derivatives.

A suitable catalyst is provided by sodium caprolactamate, potassium caprolactamate, magnesium bromide caprolactamate, magnesium chloride caprolactamate, magnesium bis-caprolactamate, sodium hydride, sodium, sodium hydroxide, sodium methanolate, sodium ethanolate, sodium propanolate, sodium butanolate, potassium hydride, potassium, potassium hydroxide, potassium methanolate, potassium ethanolate, potassium propanolate, potassium butanolate, preferably sodium hydride, sodium, sodium caprolactamate, and particularly preferably sodium caprolactamate (Bruggolen® C 10, a solution made of 18% by weight of sodium caprolactamate in caprolactam).

The molar ratio of lactam to the catalyst can vary widely and is generally from 1:1 to 10 000:1, preferably from 10:1 to 1000:1, particularly preferably from 20:1 to 300:1.

The molar ratio of lactam to the activator can vary widely and is generally from 1:1 to 10 000:1, preferably from 10:1 to 2000:1, particularly preferably from 20:1 to 1000:1.

The polyimide moldings of the invention are based by way of example on one of the following polyamides: nylon-3, nylon-4, nylon-5, nylon-6, nylon-7, nylon-8, nylon-9, nylon-10, nylon-11, nylon-12, nylon-13, nylon-14, nylon-15, nylon- 16, nylon-17, and nylon-18, or copolyamides such as nylon-4/6, nylon-5/6, nylon-4/5, nylon-6/7, nylon-6/8, nylon-6/9, nylon-6/10, nylon-6/12, nylon-4/12, nylon-4/10, nylon-5/10, nylon-5/12, preferably nylon-6, nylon-12, nylon-4/6, nylon-5/6, nylon-4/12, nylon-5/12, particularly preferably nylon-6, and nylon-12, in particular nylon-6.

The anionic polymerization reaction is generally carried out at a temperature of from 40 to 200° C., preferably from 70 to 180° C., particularly preferably from 100 to 170° C. The reaction is generally carried out at atmospheric pressure. It is also possible in principle, however, to conduct the reaction at subatmospheric pressure. It is equally possible to carry out the polymerization reaction at superatmospheric pressure.

The microcapsules comprised according to the invention in the polyamide molding comprise a capsule core composed of latent-heat-accumulator material, and comprise a capsule wall composed of polymer. The capsule core is mainly composed of more than 95% by weight of latent-heat-accumulator material. The capsule core here can be either solid or liquid, as a function of the temperature.

The production process generally requires that a protective colloid be at least to some extent incorporated concomitantly into the capsule wall, therefore likewise being a constituent of the capsule wall. It is generally in particular the surface of the polymer that comprises the protective colloid. Up to 10% by weight of the material, based on the total weight of the microcapsules, can therefore be protective colloid.

Latent-heat-accumulator materials are defined as substances which have a phase transition within the temperature range within which heat transfer is intended. It is preferable that the latent-heat-accumulator material has a solid/liquid phase transition in the temperature range from −20 to 120° C. The latent-heat-accumulator material is generally an organic, preferably lipophilic substance.

Examples of suitable substances that may be mentioned are:
  aliphatic hydrocarbon compounds, such as saturated or unsaturated $C_{10}$-$C_{40}$ hydrocarbons which are branched or preferably linear, e.g. n-tetradecane, n-pentadecane, n-hexadecane, n-heptadecane, n-octadecane, n-nonadecane, n-eicosane, n-heneicosane, n-docosane, n-tricosane, n-tetracosane, n-pentacosane, n-hexacosane, n-heptacosane, n-octacosane, and also cyclic hydrocarbons, e.g. cyclohexane, cyclooctane, cyclodecane;
  aromatic hydrocarbon compounds, such as benzene, naphthalene, biphenyl, o- or n-terphenyl, $C_1$-$C_{40}$-alkyl-substituted aromatic hydrocarbons, e.g. dodecylbenzene, tetradecylbenzene, hexadecylbenzene, hexylnaphthalene, or decylnaphthalene;
  saturated or unsaturated $C_6$-$C_{30}$ fatty acids, such as lauric, stearic, oleic, or behenic acid, preferably eutectic mixtures composed of decanoic acid with, for example, myristic, palmitic, or lauric acid;
  fatty alcohols, such as lauryl, stearyl, oleyl, myristyl, or cetyl alcohol, mixtures, such as coconut fatty alcohol, and what are known as the oxo alcohols, obtained via hydroformylation of α-olefins and further reactions;
  $C_6$-$C_{22}$-dialkyl ethers, in particular those disclosed in DE 10 2008 005 721, expressly incorporated herein by way of reference;
  $C_6$-$C_{30}$ fatty amines, such as decylamine, dodecylamine, tetradecylamine, or hexadecylamine;
  esters, such as $C_1$-$C_{10}$-alkyl esters of fatty acids, e.g. propyl palmitate, methyl stearate, or methyl palmitate, or else preferably their eutectic mixtures, or methyl cinnamate;
  natural or synthetic waxes, such as montan acid waxes, montan ester waxes, carnauba wax, polyethylene wax, oxidized waxes, polyvinyl ether wax, ethylene-vinyl acetate wax, or hard waxes from the Fischer-Tropsch process;
  halogenated hydrocarbons, such as chloroparaffin, bromooctadecane, bromopentadecane, bromononadecane, bromoeicosane, bromodocosane.

Mixtures of said substances are also suitable, as long as there is no lowering of melting point outside the desired range, and as long as the enthalpy of fusion of the mixture does not become too small for useful application.

By way of example, it is advantageous to use pure n-alkanes, n-alkanes with purity greater than 80%, or the alkane mixtures produced as industrial distillate and commercially available as such.

It may also be advantageous that compounds soluble in the lipophilic substances are added to those substances in order to mitigate the retarded crystallization which sometimes occurs in the case of nonpolar substances. It is advantageous, as described in U.S. Pat. No. 5,456,852, to use compounds whose melting point is higher by from 20 to 120 K than that of the actual core substance. Suitable compounds are the substances mentioned above as lipophilic substances in the form of fatty acids, fatty alcohols, fatty amides, and also aliphatic hydrocarbon compounds. The amounts added of these, based on the capsule core, are from 0.1 to 10% by weight.

The latent-heat-accumulator materials are selected in accordance with the temperature range in which the heat accumulators are desired. By way of example, for heat accumulators in construction materials in moderate conditions of temperature and humidity it is preferable to use latent-heat-accumulator materials whose solid/liquid phase transition is within the temperature range from 0 to 60° C. Individual substances or mixtures with transition temperatures of from 15 to 30° C. are therefore generally selected for interior applications. In the case of use as accumulator medium in solar applications, or when the intention is to avoid overheating of transparent thermal insulation as described in EP-A-333 145, transition temperatures of from 30 to 60° C. are especially suitable. For applications in the textile sector, transition temperatures from 0 to 40° C. are especially advantageous, and temperatures of from −10 to 120° C. are especially advantageous for heat-transfer liquids.

Preferred latent-heat-accumulator materials are aliphatic hydrocarbons, and particular preference is given to the examples listed above. Aliphatic hydrocarbons having from 14 to 20 carbon atoms, and also mixtures of these, are particularly preferred.

The average particle size of the capsules (volume average [D4,3] by means of light scattering) is from 1 to 50 μm. In one preferred embodiment, the average particle size of the capsules is from 1.5 to 15 μm, preferably from 3 to 10 μm. It is preferable here that the particle size of 90% of the particles is less than twice the average particle size.

The ratio by weight of capsule core to capsule wall is generally from 50:50 to 95:5. A core/wall ratio of from 70:30 to 93:7 is preferred.

The polymers of the capsule wall generally comprise, incorporated into the polymer, at least 30% by weight, preferably at least 40% by weight, particularly preferably at least 50% by weight, in particular at least 60% by weight, very particularly preferably at least 70% by weight, or else up to 100% by weight, preferably at most 90% by weight, in particular at most 85% by weight, and very particularly preferably at most 80% by weight, of at least one monomer from the group comprising $C_1$-$C_{24}$-alkyl esters of acrylic and/or methacrylic acid, acrylic acid, methacrylic acid, and maleic acid (monomers I), based on the total weight of the monomers.

The polymers of the capsule wall moreover preferably comprise, incorporated into the polymer, at least 10% by weight, preferably at least 15% by weight, with preference at least 20% by weight, and also generally at most 70% by weight, preferably at most 60% by weight, and particularly preferably at most 50% by weight, of one or more bi- or polyfunctional monomers which have no or little solubility in water (monomers II), based on the total weight of the monomers.

The polymers can also comprise up to 40% by weight, preferably up to 30% by weight, in particular up to 20% by weight, of other monomers III incorporated into the polymer. It is preferable that the capsule wall is composed only of monomers of groups I and II.

The capsule-wall polymer of the microcapsules is preferably composed of
- from 30 to 100% by weight of one or more monomers (monomers I) from the group comprising $C_1$-$C_{24}$-alkyl esters of acrylic and/or methacrylic acid, acrylic acid, methacrylic acid, and maleic acid,
- from 0 to 70% by weight of one or more bi- or polyfunctional monomers (monomers II) which have no or little solubility in water, and
- from 0 to 40% by weight of one or more other monomers (monomers III),
- based in each case on the total weight of the monomers.

Suitable monomers I are $C_1$-$C_{24}$-alkyl esters of acrylic and/or methacrylic acid, and also the unsaturated $C_3$ and $C_4$ carboxylic acids, such as acrylic acid, methacrylic acid, and also maleic acid. Isopropyl, isobutyl, sec-butyl, and tert-butyl acrylate, and the corresponding methacrylates, are suitable monomers I, as also are, these being particularly preferred, methyl, ethyl, n-propyl and n-butyl acrylate, and the corresponding methacrylates. Preference is generally given to the methacrylates and methacrylic acid.

Suitable monomers II are bi- or polyfunctional monomers which have no, or little, solubility in water but have good to limited solubility in the lipophilic substance. Little solubility means solubility smaller than 60 g/l at 20° C. Bi- or polyfunctional monomers are compounds which have at least two non-conjugated ethylenic double bonds. Divinyl and polyvinyl monomers are mainly used. They bring about crosslinking of the capsule wall during the polymerization process. It is possible to copolymerize one or more divinyl monomers, or else one or more polyvinyl monomers, or else divinyl monomers in a mixture with polyvinyl monomers.

Divinylbenzene and divinylcyclohexane are suitable divinyl monomers. Preferred divinyl monomers are the diesters of diols with acrylic acid or methacrylic acid, and also the diallyl and divinyl ethers of said diols. Examples that may be mentioned are ethanediol diacrylate, ethylene glycol dimethacrylate, butylene 1,3-glycol dimethacrylate, methallylmethacrylamide, allyl acrylate, and allyl methacrylate. Particular preference is given to propanediol diacrylate, butanediol diacrylate, pentanediol diacrylate, and hexanediol diacrylate, and the corresponding methacrylates.

Preferred polyvinyl monomers are the polyesters of polyols with acrylic acid and/or methacrylic acid, and also the polyallyl and polyvinyl ethers of said polyols, trivinylbenzene, and trivinylcyclohexane. Particular preference is given to trimethylolpropane triacrylate and -methacrylate, pentaerythritol triallyl ether, pentaerythritol tetraallyl ether, pentaerythritol triacrylate, and pentaerythritol tetraacrylate, and also to industrial mixtures of these.

Preference is given to the combinations composed of divinyl and polyvinyl monomers, for example of butanediol diacrylate and pentaerythritol tetraacrylate, hexanediol diacrylate and pentaerythritol tetraacrylate, butanediol diacrylate and trimethylolpropane triacrylate, and also hexanediol diacrylate and trimethylolpropane triacrylate.

Monomers III that can be used are other monomers which differ from the monomers I and II, examples being vinyl acetate, vinyl propionate, vinylpyridine, and styrene, or α-methylstyrene. Particular preference is given to itaconic acid, vinylphosphonic acid, maleic anhydride, 2-hydroxyethyl acrylate, 2-hydroxyethyl methacrylate, acrylamido-2-methylpropanesulfonic acid, methacrylonitrile, acrylonitrile, methacrylamide, N-vinylpyrrolidone, N-methylolacrylamide, N-methylolmethacrylamide, dimethylaminoethyl methacrylate, and diethylaminoethyl methacrylate.

The production process for the microcapsules is what is known as in-situ polymerization. The principle of microcapsule formation is based on production of a stable oil-in-water emulsion from the monomers, from a free-radical initiator, from the protective colloid, and from the lipophilic substance to be encapsulated. The polymerization of the monomers is then initiated via heating and, if appropriate, is controlled via a further increase in temperature, whereupon the resultant polymers form the capsule wall which encloses the lipophilic substance. This general principle is described by way of example in DE-A-10 139 171, the content of which is expressly incorporated herein by way of reference.

The starting emulsion is stabilized with the aid of a protective colloid. Suitable organic or inorganic protective colloids, and also the amounts of these used, are mentioned in WO 2008/071649, the disclosure of which is expressly incorporated herein by way of reference. The amounts generally used of the protective colloids are from 0.1 to 15% by weight, preferably from 0.5 to 10% by weight, based on the aqueous phase. Preferred amounts here for inorganic protective colloids are from 0.5 to 15% by weight, based on the aqueous phase. Amounts used of organic protective colloids are preferably from 0.1 to 10% by weight, based on the aqueous phase of the emulsion.

Organic protective colloids are preferably water-soluble polymers which lower the surface tension of water from 73 mN/m to at most from 45 to 70 mN/m, and thus ensure the formation of closed capsule walls, and also microcapsules with preferred particle sizes in the range from 0.5 to 50 μm, preferably from 0.5 to 30 μm, particularly from 0.5 to 10 μm.

Examples of neutral organic protective colloids are cellulose derivatives, such as hydroxyethylcellulose, methylhydroxyethylcellulose, methylcellulose, and carboxymethylcellulose, polyvinylpyrrolidone, copolymers of vinylpyrrolidone, gelatin, gum arabic, xanthan, casein, polyethylene glycols, polyvinyl alcohol, and partially hydrolyzed polyvinyl acetates, and also methylhydroxypropylcellulose. Preferred neutral organic protective colloids are polyvinyl alcohol and partially hydrolyzed polyvinyl acetates, and also methylhydroxypropylcellulose. These protective colloids are described in WO 2008/046839, the content of which is expressly incorporated herein by way of reference.

Anionic organic protective colloids are sodium alginate, polymethacrylic acid, and its copolymers, polyacrylic acid, and its copolymers, the copolymers of sulfoethyl acrylate and of sulfoethyl methacrylate, of sulfopropyl acrylate and of sulfopropyl methacrylate, of N-(sulfoethyl)maleimide, of 2-acrylamido-2-alkylsulfonic acids, of styrenesulfonic acid, and also of vinylsulfonic acid. Preferred anionic organic protective colloids are naphthalenesulfonic acid and naphthalenesulfonic-acid-formaldehyde condensates, and also especially polyacrylic acids and phenolsulfonic-acid-formaldehyde condensates.

Inorganic protective colloids that may be mentioned are those known as Pickering systems, which can provide stabilization via very fine solid particles and are insoluble in water, but dispersible, or insoluble and not dispersible in water, but wettable by the lipophilic substance.

A Pickering system here can be composed of the solid particles alone or also of auxiliaries which improve the dispersibility of the particles in water or the wettability of the particles by the lipophilic phase. The mode of action and the use of these materials is described in EP-A-1 029 018, and also EP-A-1 321 182, the contents of which are expressly incorporated herein by way of reference.

The solid inorganic particles can be metal salts, such as salts, oxides, and hydroxides of calcium, magnesium, iron, zinc, nickel, titanium, aluminum, silicon, barium, and manganese. Mention may be made of magnesium hydroxide, magnesium carbonate, magnesium oxide, calcium oxalate, calcium carbonate, barium carbonate, barium sulfate, titanium dioxide, aluminum oxide, aluminum hydroxide, and zinc sulfide. Mention may also be made of silicates, bentonite, hydroxyapatite, and hydrotalcites. Particular preference is given to fine-particle silicas, and to magnesium pyrophosphate, and tricalcium phosphate.

The Pickering systems can either be added first to the aqueous phase or else added to the stirred oil-in-water emulsion. Some fine, solid particles are prepared via precipitation, as described in EP-A-1 029 018, and also EP-A-1 321 182.

The fine-particle silicas can take the form of fine, solid particles when dispersed in water. However, it is also possible to use what are known as colloidal dispersions of silica in water. These colloidal dispersions are alkaline, aqueous mixtures of silica. In the alkaline pH range, the particles are swollen particles stable in water. For use of these dispersions as a Pickering system, it is advantageous to use an acid to adjust the pH of the oil-in-water emulsion to from 2 to 7.

Suitable $SiO_2$-based protective colloids are fine-particle silicas. They can be dispersed in the form of fine, solid particles in water. It is also possible, however, to use what are known as colloidal dispersions of silica in water. These colloidal dispersions are alkaline, aqueous mixtures of silica. In the alkaline pH range, the particles are in swollen form and are stable in water. For the use of said dispersions as protective colloid, it is advantageous that the pH of the oil-in-water emulsion is adjusted to pH from 2 to 7 by using an acid. Preferred colloidal dispersions of silica have a specific surface area in the range from 70 to 90 $m^2/g$ at pH 9.3.

Preferred $SiO_2$-based protective colloids are fine-particle silicas having average particle sizes in the range from 40 to 150 nm at pH values in the range from 8 to 11. By way of example, mention may be made of Levasil® 50/50 (H. C. Starck), Köstrosol® 3550 (CWK Bad Köstritz), and Bindzil® 50/80 (Akzo Nobel Chemicals).

It is moreover possible to add surfactants for co-stabilization, preference being given to nonionic surfactants. Suitable surfactants can be found in "Handbook of Industrial Surfactants", the content of which is expressly incorporated herein by way of reference. An amount of from 0.01 to 10% by weight of the surfactants, based on the water phase of the emulsion, can be used.

The production of the preferred microcapsules based on polymethacrylate, and also the auxiliaries suitable for this purpose, such as free-radical initiators and, if appropriate, regulators, is known and described by way of example in EP-A-1 029 018, DE 10 163 162, and WO 2008/071649, the disclosure of which is expressly incorporated herein by way of reference. The peroxo and azo compounds mentioned therein as free-radical initiators for the free-radical polymerization reaction are therefore particularly advantageously used in amounts of from 0.2 to 5% by weight, based on the weight of the monomers.

The invention preferably uses microcapsules of which the oil-in-water emulsion has been stabilized, during the production thereof, by an inorganic protective colloid.

This method can be used to produce microcapsules with an average particle size in the range from 0.5 to 100 µm, where the particle size is adjusted in a manner known per se by way of the shear force, the stirrer speed, and the particle concentration. Preference is given to microcapsules with an average particle size in the range from 0.5 to 50 µm, preferably from 0.5 to 30 µm, in particular from 3 to 10 µm, in particular from 3 to 7 µm (volume average D [4,3] by means of light scattering).

The microcapsule dispersion can be spray-dried in a conventional manner. The procedure is generally that the ingoing temperature of the stream of hot air is in the range from 100 to 200° C., preferably from 120 to 160° C., and the outgoing temperature of the stream of hot air is in the range from 30 to 90° C., preferably from 60 to 80° C. By way of example, single- or multifluid nozzles, or a rotating disk, can be used to spray the aqueous polymer dispersion in the stream of hot air. The polymer powder is usually separated by using cyclones or filter separators. It is preferable that the sprayed aqueous polymer dispersion and the stream of hot air are conducted in parallel.

Spray aids are optionally added in the spray-drying process, in order to facilitate the spray-drying process or to establish certain properties of the powder, e.g. low dust content, flowability, or improved redispersibility. The person skilled in the art is familiar with a multiplicity of spray aids. Examples here are found in DE-A 19629525, DE-A 19629526, DE-A 2214410, DE-A 2445813, EP-A 407889, or EP-A 784449. Examples of advantageous spray aids are water-soluble polymers of the following type: polyvinyl alcohol or partially hydrolyzed polyvinyl acetates, cellulose derivatives, such as hydroxyethylcellulose, carboxymethylcellulose, methylcellulose, methylhydroxyethylcellulose, and methylhydroxypropylcellulose, starch, polyvinylpyrrolidone, copolymers of vinylpyrrolidone, gelatin, and preferably polyvinyl alcohol and partially hydrolyzed polyvinyl acetates, or else methylhydroxypropylcellulose. It is preferable to operate without addition of spray aids.

The microcapsules are usually fed into the reaction mixture in the form of a powder. It is possible here to add them separately, or in a mixture with a component such as the lactam, to the catalyst or to the activator, or else in any desired combination. Addition preferably takes place in a mixture with the lactam.

The amounts generally used of microcapsules are up to 70 parts by weight, preferably from 5 to 50 parts by weight, in particular of from 10 to 40 parts by weight, based on 100 parts by weight of monomer (lactam). The polymerization process generally permits addition of large amounts of microcapsules, without any effect on the speed or completeness of the polymerization reaction. The upper limit on the amount of microcapsules is therefore dictated by the properties of the product. By way of example, amounts above 70 parts by weight were found in some instances to reduce the toughness of the cast polyamide.

In one preferred embodiment, the polyamide moldings comprise filler as further component. Examples of suitable fillers are those such as glass, boron nitride, aluminum oxide, inert metal oxides/hydroxides, and metals, and also preferably forms of carbon, e.g. graphite, carbon fibers, carbon black, and carbon nanotubes. The filler is generally used in the form of powder. An advantageous amount used of the filler is from 0.1 to 50% by weight, based on the polyamide molding. It has been found that polyamide moldings comprising filler have particularly good thermal conductivity and can give particularly rapid temperature equalization, while at the same time having high strength.

The polyamide moldings preferably comprise from 30 to 50% by weight of polyamide, from 10 to 50% by weight of microcapsules, and from 0 to 50% by weight of filler, based in each case on the polyamide molding.

The present invention further provides a process for producing polyamide moldings, by using temperature increase to initiate the polymerization reaction in a mixture comprising activator, lactam, microcapsules, optionally catalyst, and optionally filler.

The polyamide moldings of the invention exhibit good performance characteristics, in particular good heat-accumulator capacity.

The polyamide moldings of the invention are a suitable material for producing automobile parts, such as padding of frames, and of dashboards, and for the interior of passenger compartments.

They are moreover suitable for battery housings. In this instance, it is advantageous to select a latent-heat-accumulator material with a melting point in the range from 30 to 50° C.

Another preferred application is the preproduction of moldings for heat-retention systems for foods. In this instance, it is advantageous to select a latent-heat-accumulator material with a melting point in the range from 70 to 95° C.

In principle, the polyamide moldings of the invention are suitable for any housings for small electronic devices, such as mobile telephones, laptops, iPads, or in general terms plastics items which are intended to imitate metal as material.

The examples below will provide further explanation of the invention. The percentages given in the examples are percentages by weight unless otherwise stated.

The particle size of the microcapsule dispersion was determined by using a Malvern 3600E Particle Sizer or a Malvern 2000 Mastersizer, by a standard measurement method documented in the literature. The D[v, 0.1] value indicates that the size of 10% of the particles is up to said value. Correspondingly, D[v, 0.5], indicates that the particle size of 50% of the particles is smaller than or equal to said value, and D[v, 0.9] indicates that the particle size of 90% of the particles is smaller than or equal to said value. The Span value is calculated from the quotient obtained from the difference D[v, 0.9]−D[v, 0.1]), and D[v, 0.5]. The D[4,3] value gives the volume average of the particle size distribution.

EXAMPLES

Production of the Microcapsules

Example M1

Aqueous phase:
  856.88 g of water
  135.29 g of a 50% strength by weight silica sol (spec. surface area about 80 m$^2$/g)
  19.69 g of a 2.5% strength by weight aqueous solution of methylhydroxypropylcellulose with average molar mass 26 000 g/mol
  2.60 g of a 2.5% strength by weight aqueous sodium nitrite solution
  10.25 g of an 8% strength by weight solution of nitric acid in water
Oil phase
  487.33 g of a mixture of in essence linear paraffins of melting point about 26° C.
  43.32 g of hexadecane (techn.)
  10.83 g of a technical-grade paraffin of melting point about 65° C.
  101.47 g of methyl methacrylate
  33.83 g of butanediol diacrylate
Addition 1
  1.13 g of a 75% strength solution of tert-butyl perpivalate in aliphatic hydrocarbons
  1.35 g of water
Feed 1
  19.40 g of a 7% strength by weight aqueous sodium persulfate solution The aqueous phase was used as initial charge at 40° C., and the molten and homogeneously mixed oil phase was added to this and dispersed at 3500 rpm for 40 minutes by using a high-speed dissolver stirrer (disk diameter 5 cm). Addition 1 was added. The emulsion was heated to 70° C. with stirring by an anchor stirrer within a period of 60 minutes and to 90° C. within a period of a further 60 minutes, and was kept at 90° C. for 60 minutes. Feed 1 was added at 90° C. over a period of 90 minutes to the resultant microcapsule dispersion, with stirring, and the mixture was then stirred at said temperature for 2 hours. It was then cooled to room temperature and neutralized with aqueous sodium hydroxide solution. This gave a microcapsule dispersion with average particle size D [4,3] =5.1 μm and solids content 37.6%.

Creaming can be inhibited in a manner known per se by adding thickeners after cooling to room temperature.

The resultant dispersion was spray-dried using a single-fluid nozzle in a spray tower in order to obtain a pulverulent product, as is known to the person skilled in the art. The ingoing temperature of the stream of hot gas here was 130° C., and the outgoing temperature was 70° C. Spray agglomerates were obtained with average particle size D [4,3]=194.3 μm.

Synthesis of nylon-6 via anionic polymerization of ε-caprolactam

All of the polymerization reactions were carried out at 140° C. with stirring in a dry N$_2$ atmosphere in a 250 ml glass reactor.

Example PA1

34.6 g (293 mmol) of ε-caprolactam, 18 g of microcapsules of example M1, and 3.13 g (0.86 mmol) of Bruggolen® C20 activator (80% by weight of capped diisocyanate in ε-caprolactam) were mixed at 140° C. in a reactor. 4 g (5 mmol) of Bruggolen® C 10 catalyst (17% by weight of ε-caprolactamate in ε-caprolactam) were then injected into the molten mixture, and the polymerization reaction was permitted to proceed for 20 minutes, and was then terminated via cooling of the reactor in water (10° C.). This gave 58.6 g of nylon-6 in the form of solid.

The polymer comprises 0.8% of residual caprolactam and its solution viscosity is 212 (solution viscosity to ISO 307, at a concentration of 5 g/l in 96% strength sulfuric acid).
Properties of the Molding The molding produced in example PA1, comprising 31% by weight of microcapsules, was studied for heat-accumulator capacity and for emission behavior.
DSC Test Heat capacity was recorded by using a DSC test known to the person skilled in the art. 5.23 mg of molding comprising microcapsules (31%) were weighed into the apparatus and cooled from a temperature of 35° C. to −21° C. by using a temperature gradient of 1 K/min. The subsequent heating procedure used a heating rate of 1 K/min for heating up to 42° C. The heat capacity recorded was 34 J/g.

Fogging test (condensation of volatile fractions within the product)

Apparatus: 2 twist-off glass vessels with aluminum cap, comprising an aluminum foil and a Viton gasket. Ministat thermostat, IKA heating bath, cooling plate.

Method (two determinations):

In each case, 10.00 g of the molding were weighed into the twist-off glass vessels. Aluminum disks were then inserted into the aluminum cap and the Viton gasket was inserted thereon, and the lids were then screwed onto the twist-off glass vessels. The glass vessels thus prepared were placed in an IKA heating bath preheated to 80° C. The plate cooled to 15° C. by means of a thermostat was placed onto the caps of the glass vessels. After 24 hours, the glass vessels were removed from the heating bath, and the aluminum disks were removed, and they were placed in a desiccator in order to remove residual water. After 24 hours of drying time, the aluminum disks were weighed on the analysis balance. The amount of emission from the molding analyzed was 1.92 mg/g.

The invention claimed is:

1. A process for producing a polyamide molding comprising a polylactam and microcapsules with a capsule core comprising a latent-heat-accumulator material and a polymer as a capsule wall, wherein the polyamide molding comprises from 30 to 50% by weight of polyamide, from 10 to 50% by weight of the microcapsules, and from 0 to 50% by weight of a filler, based in each case on the weight of the polyamide molding, and wherein the latent-heat-accumulator material is a linear paraffin, the process comprising:
    anionically polymerizing a lactam in a mold to form the polyamide molding by a temperature increase of a mixture comprising an activator, the lactam, the microcapsules, a catalyst, and optionally the filler,
    wherein the polymerizing is carried out by mixing the microcapsules, the lactam and the activator in the mold to form a molten polymerization mixture, then
    injecting the catalyst into the mold as a mixture with the lactam,
    wherein the polymerizing forms a polyamide molding comprising no more than 0.8% residual lactam.

2. The process of claim 1, wherein the lactam is selected from the group consisting of caprolactam, piperidone, pyrrolidone, and laurolactam, and mixtures thereof.

3. The process of claim 1, wherein the linear paraffin has a solid/liquid phase transition in the temperature range from 20 to 120° C.

4. The process of claim 1, wherein the average particle size of the microcapsules is from 1.5 to 15 μm.

5. The process of claim 1, wherein the capsule-wall of the microcapsules is a polymer that comprises
    from 30 to 100% by weight of one or more monomers (I) selected from the group consisting of $C_1$-$C_{24}$-alkyl esters of acrylic, $C_1$-$C_{24}$ alkyl esters of methacrylic acid, acrylic acid, methacrylic acid, and maleic acid,
    from 0 to 70% by weight of one or more bi- or polyfunctional monomers (II) which have no or little solubility in water, and
    from 0 to 40% by weight of one or more other monomers (III), based in each case on the total weight of the monomers.

6. The process of claim 1, wherein the microcapsules are obtained by producing an oil-in-water emulsion comprising the monomers, a free-radical initiator, a protective colloid, and the lipophilic substance to be encapsulated, and heating to initiate polymerization of the monomers, and optionally further increasing the temperature to control the polymerization.

7. The process of claim 6, wherein the oil-in-water emulsion has been stabilized by an inorganic protective colloid.

8. The process of claim 1, wherein the capsule wall comprises polymerized methyl methacrylate, and the polylactam comprises polymerized units of ϵ-caprolactam.

9. The process of claim 1, wherein the polyamide molding comprises 20-50% by weight of the filler.

10. The process of claim 9, wherein the filler is at least one selected from the group consisting of a glass, boron nitride, aluminum oxide, an inert metal oxide, an inert metal hydroxide, a metal, graphite, carbon fiber, carbon black and a carbon nanotube.

11. The process of claim 1, wherein the capsule core consists of the latent-heat-accumulator material.

12. The process of claim 1, wherein the capsule core consists essentially of the latent-heat-accumulator material.

13. The process of claim 1, wherein the activator is a capped diisocyanate.

14. The process of claim 1, wherein the catalyst is a lactamate.

15. A process for producing a polyamide molding comprising a polylactam and microcapsules having a capsule core comprising a latent-heat-accumulator material and a capsule wall comprising a polymer, wherein the polyamide molding comprises from 30 to 50% by weight of polyamide, from 10 to 50% by weight of the microcapsules, and from 0 to 50% by weight of a filler, based in each case on the weight of the polyamide molding, which comprises:
    anionically polymerizing a lactam in a mold to form the polyamide molding by a temperature increase of a mixture comprising an activator, the lactam, the microcapsules, a catalyst, and optionally the filler,
    wherein the polymerizing is carried out by mixing the microcapsules, the lactam and the activator in the mold to form a molten polymerization mixture, then
    injecting the catalyst into the mold as a mixture with the lactam,
    wherein the polymerizing forms a polyamide molding comprising no more than 0.8% residual lactam.

16. The process of claim 15, wherein the lactam is selected from the group consisting of caprolactam, piperidone, pyrrolidone, and laurolactam, and mixtures thereof.

17. The process of claim 15, wherein the latent heat accumulation material is a linear paraffin having a solid/liquid phase transition in the temperature range from 20 to 120° C.

18. The process of claim 15, wherein the average particle size of the microcapsules is from 1.5 to 15 μm.

19. The process of claim 15, wherein the capsule-wall of the microcapsules is a polymer that comprises
    from 30 to 100% by weight of one or more monomers (I) selected from the group consisting of $C_1$-$C_{24}$-alkyl esters of acrylic, $C_1$-$C_{24}$ alkyl esters of methacrylic acid, acrylic acid, methacrylic acid, and maleic acid,
    from 0 to 70% by weight of one or more bi- or polyfunctional monomers (II) which have no or little solubility in water, and from 0 to 40% by weight of one or more other monomers (III), based in each case on the total weight of the monomers.

20. The process of claim 19, wherein the microcapsules are obtained by producing an oil-in-water emulsion comprising the monomers, a free-radical initiator, a protective colloid, and the lipophilic substance to be encapsulated, and heating to initiate polymerization of the monomers, and optionally further increasing the temperature to control the polymerization.

21. The process of claim 20, wherein the oil-in-water emulsion has been stabilized by an inorganic protective colloid.

22. The process of claim 15, wherein the capsule wall comprises polymerized methyl methacrylate, and the polylactam comprises polymerized units of $\epsilon$-caprolactam.

23. The process of claim 15, wherein the polyamide molding comprises 20-50% by weight of the filler.

24. The process of claim 23, wherein the filler is at least one selected from the group consisting of a glass, boron nitride, aluminum oxide, an inert metal oxide, an inert metal hydroxide, a metal, graphite, carbon fiber, carbon black and a carbon nanotube.

25. The process of claim 15, wherein the capsule core consists of the latent-heat-accumulator material.

26. The process of claim 15, wherein the capsule core consists essentially of the latent-heat-accumulator material.

27. The process of claim 15, wherein the activator is a capped diisocyanate.

28. The process of claim 15, wherein the catalyst is a lactamate.

* * * * *